United States Patent
Sugawara

(10) Patent No.: US 11,713,383 B2
(45) Date of Patent: Aug. 1, 2023

(54) METHOD FOR PRODUCING POROUS FILM, METHOD FOR PRODUCING COMPOSITION FOR PRODUCING POROUS FILM, AND POROUS FILM

(71) Applicant: TOKYO OHKA KOGYO CO., LTD., Kanagawa (JP)

(72) Inventor: Tsukasa Sugawara, Kanagawa (JP)

(73) Assignee: TOKYO OHKA KOGYO CO., LTD., Kanagawa (JP)

( * ) Notice: Subject to any disclaimer, the term of this patent is extended or adjusted under 35 U.S.C. 154(b) by 435 days.

(21) Appl. No.: 16/724,820

(22) Filed: Dec. 23, 2019

(65) Prior Publication Data
US 2020/0199322 A1 Jun. 25, 2020

(30) Foreign Application Priority Data
Dec. 25, 2018 (JP) .................. 2018-241734

(51) Int. Cl.
*C08J 9/26* (2006.01)
*B05D 3/08* (2006.01)
*B05D 5/02* (2006.01)

(52) U.S. Cl.
CPC ..................... *C08J 9/26* (2013.01); *B05D 3/08* (2013.01); *B05D 5/02* (2013.01); *C08J 2201/044* (2013.01); *C08J 2205/042* (2013.01); *C08J 2379/08* (2013.01)

(58) Field of Classification Search
CPC .. C08J 9/26; C08J 2201/044; C08J 2205/042; C08J 2381/06; C08J 3/215; C08J 5/18; B05D 3/08; B05D 5/02; B05D 2601/22; B05D 5/00; C08K 3/36; C08K 2201/011
See application file for complete search history.

(56) References Cited

U.S. PATENT DOCUMENTS

2016/0372728 A1* 12/2016 Yoshimaru ................ B32B 5/32
2018/0244887 A1*  8/2018 Sugawara ................ C08J 3/212

FOREIGN PATENT DOCUMENTS

| CN | 107922663 | 4/2018 |
| JP | 2006-56196 | 3/2006 |
| JP | 5605566 | 10/2014 |

* cited by examiner

*Primary Examiner* — Kara B Boyle
(74) *Attorney, Agent, or Firm* — Wenderoth, Lind & Ponack, L.L.P.

(57) ABSTRACT

To provide a method for producing a porous film in which even when minute fine particles are used, fine particles can be satisfactorily dispersed, a method for producing a composition for producing a porous film, and a porous film that can be produced by the method for producing a porous film. When a porous film is formed using a varnish including at least one resin component selected from the group consisting of polyamide acid, polyimide, a polyamide-imide precursor, polyamide-imide and polyethersulfone, and fine particles, varnish is produced by dispersing the fine particles by using a pressure device that pressurizes slurry including the fine particles and a dispersing device provided with a flow path whose cross-sectional area is 1960 μm² or more and 785000 μm² or less, and allowing the slurry pressurized to 50 MPa or more to pass through the flow path.

9 Claims, No Drawings

METHOD FOR PRODUCING POROUS FILM, METHOD FOR PRODUCING COMPOSITION FOR PRODUCING POROUS FILM, AND POROUS FILM

This application is based on and claims the benefit of priority from Japanese Patent Application No. 2018-241734, filed on 25 Dec. 2013, the content of which is incorporated herein by reference.

BACKGROUND OF THE INVENTION

Field of the Invention

The present invention relates to a method for producing a porous film, a method for producing a composition for producing a porous film, and a porous film.

Related Art

In recent years, a porous film of polyimide, polyamide-imide, polyethersulfone, or the like, has been researched as filter used for a separation film for a gas or liquid, or a separator for a lithium-ion battery, an electrolyte film for fuel cell, a low dielectric constant material, or the like.

Examples of the well-known method for producing a polyimide porous film to be used as a separator include a method which includes applying a varnish containing silica particles dispersed in a polymer solution of polyamide acid, polyimide, and the like, onto a substrate to form a coating film, then heating the coating film as necessary so as to obtain a polyimide film containing silica particles, and then removing silica in the polyimide film by elusion using a hydrogen fluoride solution so as to make the film porous (see Patent Document 1).

Patent Document 1: Japanese Patent No. 5605566

SUMMARY OF THE INVENTION

A particle-removing effect of a filter is generally determined depending on the sieving effect and the adsorption effect. In order to enhance the sieving effect and the adsorption effect with respect to a porous film, it is effective to make a pore diameter finer and to increase a specific surface area. Use of a varnish including fine particles whose particle diameter is small enables a porous film having an aperture of a smaller pore diameter and having a large specific surface area to be formed.

However, fine particles such as fine silica particles having an average particle diameter of, for example, about 400 nm easily cause aggregation in the above-mentioned varnish, thus making uniform dispersion difficult. The dispersibility of fine particles is improved to some extent by addition of a dispersant. However, the finer the fine particles are, the more limited the effect of the dispersant is. Therefore, it has been difficult to obtain a porous film in which micropores having a minute diameter (for example, about 400 nm) are uniformly formed.

The present invention has been made in view of the above-mentioned circumstances, and an object of the present invention is to provide a method for producing a porous film in which even when minute fine particles are used, the fine particles can be satisfactorily dispersed, a method for producing a composition for producing a porous film, and a porous film that can be produced by the method for producing a porous film.

In order to solve the above-mentioned problems, the present inventors have conducted extensive studies. As a result, they have found that, the above-mentioned problems can be solved when a varnish including at least one resin component selected from the group consisting of polyamide acid, polyimide, a polyamide-imide precursor, polyamide-imide and polyethersulfone, and fine particles, is used, and a porous film derived from the resin component is formed, a varnish is produced by dispersing the fine particles by using a pressure device that pressurizes slurry including the fine particles and a dispersing device provided with a flow path whose cross-sectional area is 1960 μm$^2$ or more and 785000 μm$^2$ or less, and allowing the slurry pressurized to 50 MPa or more to pass through the flow path, and they have completed the present invention.

A first aspect of the present, invention is method for producing a porous film, Comprising: a preparation step of preparing a composition for producing a porous film containing at least one resin component selected from the group consisting of polyamide acid, polyimide, a polyamide-imide precursor, polyamide-imide and polyethersulfone, and fine particles, wherein the preparation step includes a dispersion step of dispersing the fine particles using a pressure device that pressurizes slurry including the fine particles and a dispersing device provided with a flow path whose cross-sectional area is 1960 μm$^2$ or more and 785000 μm$^2$ or less, by allowing the slurry pressurized to 50 MPa or more to pass through the flow path.

A second aspect of the present invention is a method for producing a composition for producing a porous film: the method comprising: a step of preparing slurry (1) including fine particles and a solvent; a step of preparing a resin liquid (1) including at least one resin component selected from the group consisting of polyamide acid, polyimide, a polyamide-imide precursor, polyamide-imide and polyethersulfone, and a solvent; a step of preparing slurry (2) by kneading the slurry (1) and the resin liquid (1); and a step of dispersing the fine particles using a pressure device that pressurizes the slurry (2) and a dispersing device provided with a flow path having a cross-sectional area of 1960 μm$^2$ or more and 785000 μm$^2$ or less by allowing the slurry (2) pressurized to 50 MPa or more to pass through the flow path.

A third aspect of the present invention is a porous film comprising at least one resin component selected from the group consisting of polyimide, polyamide-imide, and polyethersulfone, wherein in a pore diameter distribution of the porous film as distribution of every 1 nm section, obtained by measurement by a bubble point, method under conditions in which a measured pressure range is 0 or more and 400 psi or less, using perfluoropolyester having an interfacial tension value of 15.9 dyne/cm, a sum of pore distribution (%) in a first section having the smallest pore diameter and pore distribution (%) in a second section having the second smallest pore diameter is 70% or more, and no section other than the first section and the second section has pore distribution of 7% or more.

The present invention can provide a method for producing a porous film in which even when minute fine particles are used, fine particles can be satisfactorily dispersed, a method for producing a composition for producing a porous film, and a porous film that can be produced by the method for producing a porous film.

DETAILED DESCRIPTION OF THE INVENTION

Embodiments of the present invention will now be described in detail, but the present invention is not necessarily limited to the following embodiments and can be implemented with appropriate modifications within the purpose of the present invention.

Method for Producing Porous Film

A method for producing a porous film includes a preparation step of preparing a composition for producing a porous film (hereinafter, also simply referred to as varnish) containing a resin component and fine particles. The preparation step includes a dispersion step of dispersing the fine particles using a pressure device that pressurizes slurry including the fine particles and a dispersing device provided with a flow path whose cross-sectional area is 1960 $\mu m^2$ or more and 785000 $\mu m^2$ or less, by allowing the slurry pressurized to 50 MPa or more to pass through the flow path. The resin component to be used include one or more selected from the group consisting of polyamide acid, polyimide, a polyamide-imide precursor, polyamide-imide and polyethersulfone. Hereinafter, the preparation step of the composition for producing a porous film will be described.

Preparation Step of Composition for Producing Porous Film

As described above, the preparation step of a composition for producing a porous film includes a dispersion step of dispersing the fine particles using a pressure device that pressurizes slurry including the fine particles and a dispersing device provided with a flow path whose cross-sectional area is 1960 $\mu m^2$ or more and 785000 $\mu m^2$ or less, by allowing the slurry pressurized to 50 MPa or more to pass through the flow path. The device to be used in the dispersion step is not particularly limited as long as the device includes a flow path having a predetermined cross-sectional area, and a pressure device for feeding slurry pressurized to 50 MPa or more to the flow path. When slurry including fine particles and a resin component and pressurized to 50 MPa or more is allowed to pass through a thin flow path having such a cross-sectional area, a strong shearing force acts on the fine particles in the slurry. As a result, even when minute fine particles are used, the fine particles in the slurry can be satisfactorily dispersed. Examples of the dispersing device that satisfies the above-mentioned conditions include Star Burst series manufactured by SUGINO MACHINE LIMITED, dispersing devices manufactured by YOSHIDA KIKAI CO., LTD, and the like. Note here that the dispersion treatment by the dispersing device may be carried out repeatedly considering the length of the flow path having a predetermined cross-sectional area, and the particle diameter after dispersion. The number of repetitions is not particularly limited, and the treatment may be repeated until the fine particles are in a desired dispersion state.

The cross-sectional area of the flow path through which the slurry is allowed to flow is preferably 3000 $\mu m^2$ or more, more preferably 10000 $\mu m^2$ or more, and further preferably 100000 $\mu m^2$ or more from the viewpoint that blockage of slurry does not easily occur, treatment of a large amount of slurry can be easily carried out, and the like. The cross-sectional area of the flow path through which the slurry is allowed to flow is preferably 700000 $\mu m^2$ or less, mere preferably 600000 $\mu m^2$ or less, and further preferably 500000 $\mu m^2$ or less from the viewpoint that the excellent dispersion effect of the fine particles is achieved.

In the flow path, it is only required that at least a part of the cross-sectional area is within the above-mentioned range. In the flow path through which the slurry is allowed to flow, the length of a part that satisfies the above-mentioned range of the cross-sectional area is, for example, preferably 1 $\mu m$ or more, more preferably 5 $\mu m$ or more, further preferably 20 $\mu m$ or more, and still further preferably 50 $\mu m$ or more. In the flow path through which the slurry is allowed to flow, the length of a part that, satisfies the above-mentioned range of the cross-sectional area may be, for example, 100 $\mu m$ or more, 200 $\mu m$ or more, and 500 $\mu m$ or more. In the flow path through which the slurry is allowed to flow, the upper limit of the length of a part that satisfies the above-mentioned range is not particularly limited, but it may be, for example, 50 mm or less, 30 mm or less, and 10 mm or less, from the viewpoint of treatment efficiency of the slurry, miniaturization of the dispersing device.

A cross-sectional shape of the flow path is not particularly limited. A cross-sectional shape of the flow path is not particularly limited, and it is typically circular or rectangular shapes such as square and oblong. Since formation of the flow path is easy, the cross-sectional shape of the flow path is preferably circular. In the flow path whose cross-sectional shape is circular, the inner diameter of the cross-section of the flow path is not particularly limited as long as the cross-sectional area of the flow path is within the above-mentioned range. The inner diameter (diameter) of the cross-sectional area of the flow path whose cross-sectional shape is circular is preferably, for example, 60 $\mu m$ or more and 1 mm (1000 $\mu m$) or less.

It is preferable that the above-mentioned dispersing device allows dispersion of fine particles to proceed in the flow path, and allows the pressurized slurry to collide against one another or to collide against a collision part provided on the flow path. Such a method facilitates dispersion of fine particles in the slurry by collision of fine particle aggregates one another or collision between fine particle aggregates and the collision part.

Examples of the method of allowing the pressurized slurry to collide against one another include a method using a device designed such that a plurality of two or more flow paths through which the pressurized slurry is allowed to pass are provided, and two or more of the plurality of flow paths are joined. The flow path on the downstream side in the flow direction of the slurry from the joining point in which the slurry collides may be a single flow path or a plurality of two or more flow paths. The flow path on the downstream side in the flow direction of the slurry from the joining point in which the slurry collides is a plurality of flow paths, two or more of the plurality of flow paths may be joined again.

In the method of allowing the slurry to collide against a collision part provided on the flow path, the shape and the like of the collision part is not particularly limited as long as the slurry travelling in the flow path collides against the collision part. Typically, a collision surface perpendicular or substantially perpendicular to the travelling direction of the slurry is provided as the collision part on the flow path. The shape of the collision surface is not particularly limited, and it may be a plane surface or a curved surface including a spherical surface. The surface of the collision surface may be a smooth surface or a roughened surface having regular or irregular unevenness.

Typically, a bent portion which is bent at a right angle or substantially right angle is formed on a flow path through which the slurry is allowed to flow is provided, and a surface of the bent portion in which the travelling slurry collides is defined as the collision part.

Furthermore, mesh or orifice having a pore diameter and opening rate, which do not excessively prevent passage of the slurry, may be provided in the flow path as the collision part.

The pressure device that pressurizes the slurry including fine particles is not particularly limited as long as it can pressurize the slurry to a desired pressure. As the pressure device, typically, various well-known pumps are used. Also, the slurry can be pressurized by introducing a high pressure gas into a pressure-resistant vessel for storing the slurry. The pressure to the slurry is, as mentioned above, 50 MPa or more, preferably 80 MPa or more, more preferably 100 MPa or more, and particularly preferably 130 MPa or more. The upper limit of the pressure to the slurry is not particularly limited as long as pressure can be applied by the above-mentioned pressure device, and the pressure is within the pressure resistance performance of the dispersing device. The upper limit may be, for example, 300 MPa or less, may be 250 MPa or less, may be 220 MPa or less, and may be 200 MPa or less.

The average particle diameter of the fine particles is preferably 400 nm or less, more preferably 350 nm or less, further preferably 10 nm or more and 300 nm or less, further more preferably 20 nm or more and 200 nm or less, and particularly preferably 30 nm or more and 150 nm or less. Use of fine particles having an average particle diameter within such a range makes it easy to form a porous film having micropore having a desired pore diameter and having an excellent particle removing effect. Note here that the size of a pore part derived from a fine particle formed in the porous film is the same as or similar to the average particle diameter of the fine particles. Therefore, from the viewpoint of permeation property and the like of fluid when a porous film is used as a filter, the average particle diameter of fine particles is preferably 5 nm or more and more preferably 10 nm or more. Furthermore, it is preferable that the fine particles have a high sphericity and a low particle diameter distribution index. Fine particles satisfying these conditions show excellent dispersibility in the varnish and can be used without causing aggregation with one another.

The content of fine particles in the slurry is, for example, 5% by mass or more and 95% by mass or less, preferably 20% by mass or more and 90% by mass or less, and more preferably 30% by mass or more and 85% by mass or less with respect to the mass of the slurry. When the content of fine particles is in the above-mentioned range, a porous film is easily formed without easily causing aggregation of the fine particles in a varnish, and without causing cracking and the like on the surface. Thus, a porous film having excellent filter performance can be produced stably.

The viscosity of the slurry after dispersion is preferably 0.1 Pa·s or more and 3.0 Pa·s or less from the viewpoint of operation property in production of a porous film. Note here that an adjusting step of adding a solvent or the like to the slurry after dispersion may be performed such that the viscosity of the slurry is in the above range. From the viewpoint of dispersion stability, however, it is preferable that the slurry after dispersion is a composition for producing a porous film to be used for formation of a film of the below-mentioned unburned composite film.

Next, a preparation step of a composition for producing a porous film will be described specifically.

First Embodiment

A preparation step of a composition for producing a porous film may include a step of preparing slurry (1) including fine particles and a solvent; a step of preparing a resin liquid (1) including at least one resin component selected from the group consisting of polyamide acid, polyimide, a polyamide-imide precursor, polyamide-imide and polyethersulfone, and a solvent; a step of kneading the slurry (1) and the resin liquid (1) to prepare slurry (2); and a step of dispersing fine particles in the slurry (2) by using the above-described dispersing device. The solid content concentration of the slurry (2) is not particularly limited, but it is, for example, 1% by mass or more, preferably 5% by mass or more, and more preferably 10% by mass or more, and the upper limit is, for example, 60% by mass or less. Furthermore, a volume ratio of the fine particles and the resin component (fine particle/resin component) in the slurry (2) is, for example, 0.5 to 4.5, and preferably 1.5 to 3.

The above-mentioned preparation step may include a step of kneading the slurry (2) by a centrifugal force, for example, kneading by using a rotation-revolution type mixer as a pre-step before the step of dispersing fine particles in the slurry (2) using the above-described dispersing device. Furthermore, the above-mentioned preparation step may include a step of kneading the slurry (2) by a planetary mixer as a pre-step before the step of dispersing fine particles in the slurry (2) using the above-described dispersing device. In addition, in the above-mentioned preparation step, before preparing the slurry (2), fine particles in the slurry (1) may be dispersed using the above-described dispersing device.

Second Embodiment

A preparation step of a composition for producing a porous film may include, a step of preparing slurry (1) including fine particles and a solvent; a step of dispersing fine particles in the slurry (1) using the above-described dispersing device; a step of preparing a resin liquid (1) including at least one resin component selected from the group consisting of polyamide acid, polyimide, a polyamide-imide precursor, polyamide-imide and polyethersulfone, and a solvent; and a step of preparing slurry (2) by kneading the slurry (1) and the resin liquid (1).

When fine particles in the slurry (1) are dispersed using the above-described dispersing device, the rate of the fine particles in the slurry (1) is not particularly limited, but it is, for example, 1% by mass or more, preferably 5% by mass or more, and more preferably 10% by mass or more, and the upper limit is, for example, 90% by mass or less. The solid content concentration of the slurry (2) in the second embodiment is not particularly limited, but it is, for example, 1% by mass or more, preferably 5% by mass or more, more preferably 10% by mass or more, and the upper limit is, for example, 60% by mass or less. Furthermore, a volume ratio of the fine particles and the resin component (fine particle/resin component) in the slurry (2) is, for example, 0.5 to 4.5, and preferably 1.5 to 3.

The above-mentioned preparation step may include a step of dispersing the slurry (1) by an impact force, for example, dispersing using a homogenizer, as a pre-step before the step of dispersing the fine particles in the slurry (1) by using the above-described dispersing device. The preparation step may include a step of kneading the slurry by a centrifugal force, for example, kneading the slurry (1) and the resin liquid (1) using a rotation-revolution type mixer, as a pre-step before the step of kneading the slurry (1) and the resin liquid (1) that have undergone the dispersion step. When the slurry (1) and the resin liquid (1) that have undergone the dispersion step are kneaded, reaggregation of fine particles easily occurs. Thus, the preparation step may include a step of dispersing fine particles by a shearing force and a compression or impact force again, as a post-step after the step of kneading the slurry (1) and the resin liquid (2) that, have undergone the dispersion step. Furthermore, in the above-mentioned preparation step, fine particles in the slurry (2) may be dispersed using the above-described dispersing device after the slurry (2) is prepared.

Third Embodiment

A preparation step of a composition for producing a porous film may include, for example, a step of preparing slurry (3) containing fine particles, and at least one resin component selected from the group consisting of polyamide acid, polyimide, a polyamide-imide precursor, polyamide-imide and polyethersulfone, and dispersing the slurry (3) using the above-described dispersing device. A viscosity of the slurry (3) is preferably 5.0 Pa·s or less, more preferably 0.1 Pa·s or more and 3.0 Pa·s or less, when fine particles in the slurry (3) are dispersed by using the above-described dispersing device, the solid content concentration of the slurry (3) is not particularly limited, but it is, for example, 1% by mass or more, preferably 5% by mass or more, and more preferably 10% by mass or more, and the upper limit is, for example, 60% by mass or less. Furthermore, a volume ratio of the fine particles and the resin component (fine particle/resin component) in the slurry (3) is, for example, 0.5 to 4.5, and preferably 1.5 to 3.

Composition for Producing Porous Film

Hereinafter, essential or optional components of a varnish used in a preparation step of a composition for producing a porous film (varnish) will be described.

Resin Component

A varnish contains at least one selected from the group consisting of polyamide acid, polyimide, a polyamide-imide precursor, polyamide-imide and polyethersulfone as a resin component. Hereinafter, polyamide acid, polyimide, polyamide-imide and a polyamide-imide precursor, and polyethersulfone will be described sequentially.

Polyamide Acid

The polyamide acid may be any product prepared by polymerizing appropriate tetracarboxylic dianhydride and diamine, which can be used without particular limitation. The amounts of the tetracarboxylic dianhydride and the diamine to be used are not particularly limited, and the amount of the diamine is preferably 0.50 or more and 1.50 mol or less, more preferably 0.60 or more and 1.30 mol or less, and particularly preferably 0.70 or more and 1.20 mol or less, based on 1 mol of the tetracarboxylic dianhydride.

The tetracarboxylic dianhydride can be appropriately selected from tetracarboxylic dianhydrides that have been conventionally used as raw materials for synthesizing polyamide acids. The tetracarboxylic dianhydride may be an aromatic tetracarboxylic dianhydride or an aliphatic tetracarboxylic dianhydride, but from the viewpoint of the heat resistance of the resulting polyimide resin, an aromatic tetracarboxylic dianhydride is preferably used. One type of tetracarboxylic dianhydride may be used alone or in combination of two or more types thereof.

Preferred examples of the aromatic tetracarboxylic dianhydride include pyromellitic dianhydride, 1,1-bis(2,3-dicarboxyphenyl)ethane dianhydride, bis(2,3-dicarboxyphenyl)methane dianhydride, bis(3,4-dicarboxyphenyl)methane dianhydride, 3,3',4,4'-biphenyltetracarboxylic dianhydride, 2,3,3',4'-biphenyltetracarboxylic dianhydride, 2,2,6,6-biphenyltetracarboxylic dianhydride, 2,2-bis(3,4-dicarboxyphenyl)propane dianhydride, 2,2-bis(2,3-dicarboxyphenyl)propane dianhydride, 2,2-bis(3,4-dicarboxyphenyl)-1,1,1,3,3,3-hexafluoropropane dianhydride, 2,2-bis(2,3-dicarboxyphenyl)-1,1,1,3,3,3-hexafluoropropane dianhydride, 3,3',4,4'-benzophenonetetracarboxylic dianhydride, bis(3,4-dicarboxyphenyl)ether dianhydride, bis(2,3-dicarboxyphenyl)ether dianhydride, 2,2',3,3'-benzophenonetetracarboxylic dianhydride, 4,4-(p-phenylenedioxy)diphthalic dianhydride, 4,4-(m-phenylenedioxy)diphthalic dianhydride, 1,2,5,6-naphthalenetetracarboxylic dianhydride, 1,4,5,8-naphthalenetetracarboxylic dianhydride, 2,3,6,7-naphthalenetetracarboxylic dianhydride, 1,2,3,4-benzenetetracarboxylic dianhydride, 3,4,9,10-perylenetetracarboxylic dianhydride, 2,3,6,7-anthracenetetracarboxylic dianhydride, 1,2,7,8-phenanthrenetetracarboxylic dianhydride, 9,9-bisphthalic anhydride fluorene, and 3,3',4,4'-diphenylsulfonetetracarboxylic dianhydride. Examples of the aliphatic tetracarboxylic dianhydride include ethylenetetracarboxylic dianhydride, butanetetracarboxylic dianhydride, cyclopentanetetracarboxylic dianhydride, cyclohexanetetracarboxylic dianhydride, 1,2,4,5-cyclohexanetetracarboxylic dianhydride, and 1,2,3,4-cyclohexanetetracarboxylic dianhydride. Among these, 3,3',4,4'-biphenyltetracarboxylic dianhydride and pyromellitic dianhydride are preferred because of their inexpensiveness, ready availability, etc. One type of tetracarboxylic dianhydride may be used alone or as a mixture of two or more thereof.

The diamine can be appropriately selected from diamines that have beers conventionally used as raw materials for synthesizing polyamide acids. The diamine may be an aromatic diamine or an aliphatic diamine, but from the viewpoint of the heat resistance of the resulting polyimide resin, an aromatic diamine is preferred. One type of these diamines may be used alone or in combination of two or more types thereof.

Examples of the aromatic diamine include diamino compounds having one phenyl group or about two or more and ten or less phenyl groups. Specifically, examples of the aromatic diamine include phenylenediamines and their derivatives, diaminobiphenyl compounds and their derivatives, diaminodiphenyl compounds and their derivatives, diaminotriphenyl compounds and their derivatives, diaminonaphthalenes and their derivatives, aminophenylaminoindanes and their derivatives, diaminotetraphenyl compounds and their derivatives, diaminohexaphenyl compounds and their derivatives, and cardo-type fluorenediamine derivatives.

The phenylenediamines are, for example, m-phenylenediamine and p-phenylenediamine. The phenylenediamine derivatives are diamines to which alkyl groups, such as a methyl group or an ethyl group, are bound, such as 2,4-diaminotoluene and 2,4-triphenylenediamine.

In the diaminodiphenyl compounds, two aminophenyl groups are bonded to each other. For example, the diaminodiphenyl compounds are 4,4'-diaminobiphenyl and 4,4'-diamino-2,2'-bis(trifluoromethyl)biphenyl.

The diaminodiphenyl compound is a compound obtained by linkage of two aminophenyl groups at their phenyl groups via another group. The linkage is, for example, an ether linkage, a sulfonyl linkage, a thioether linkage, a linkage of an alkylene or its derivative group, an imino linkage, an azo linkage, a phosphine oxide linkage, an amide linkage, or an ureylene linkage. The number of carbon atoms of the alkylene linkage is about 1 or more and 6 or less. The derivative group is an alkylene group whose one or more hydrogen atoms have been replaced by, for example, halogen atoms.

Examples of the diaminodiphenyl compounds include 3,3'-diaminodiphenyl ether, 3,4'-diaminodiphenyl ether, 4,4'-diaminodiphenyl ether, 3,3'-diaminodiphenyl sulfone, 3,4'-diaminodiphenyl sulfone, 4,4'-diaminodiphenyl sulfone, 3,3'-diaminodiphenyl methane, 3,4'-diaminodiphenyl methane, 4,4'-diaminodiphenyl methane 4,4'-diaminodiphenyl sulfide, 3,3'-diaminodiphenyl ketone, 3,4'-diaminodiphenyl ketone, 2,2-bis(p-aminophenyl)propane, 2,2'-bis(p-aminophenyl)hexafluoropropane, 4-methyl-2,4-bis(p-aminophenyl)-1-pentene, 4-methyl-2,4-bis(p-aminophenyl)-2-pentene, iminodianiline, 4-methyl-2,4-bis(p-aminophenyl)pentane, bis(p-aminophenyl)phosphine oxide, 4,4'-diaminoazobenzene, 4,4'-diaminodiphenylurea, 4,4'-diaminodiphenylamide, 1,4-bis(4-aminophenoxy)benzene, 1,3-bis(4-aminophenoxy)benzene, 1,3-bis(3-aminophenoxy)benzene, 4,4'-bis(4-aminophenoxy)biphenyl, bis[4-(4-aminophenoxy)phenyl] sulfone, bis[4-(3-aminophenoxy)phenyl]sulfone, 2,2-bis[4-(4-aminophenoxy)phenyl]propane, and 2,2-bis[4-(4-aminophenoxy)phenyl]hexafluoropropane.

Among these, p-phenylenediamine, m-phenylenediamine, 2,4-diaminotoluene, and 4,4'-diaminodiphenylether are preferred because of their inexpensiveness, ready availability, etc.

The diaminotriphenyl compound is formed by linkage of two aminophenyl groups and one phenylene group, all of which are each linked through another group. The "another group" is selected from the same groups as in the diaminodiphenyl compounds. Examples of the diaminotriphenyl compounds include 1,3-bis(m-aminophenoxy)benzene, 1,3-bis(p-aminophenoxy)benzene, and 1,4-bis(p-aminophenoxy)benzene.

Examples of the diaminonaphthalenes include 1,5-diaminonaphthalene and 2,6-diaminonaphthalene.

Examples of the aminophenylaminoindanes include 5- or 6-amino-1-(p-aminophenyl)-1,3,3-trimethylindane.

Examples of the diaminotetraphenyl compounds include 4,4'-bis(p-aminophenoxy)biphenyl, 2,2'-bis[p-(p'-aminophenoxy)phenyl]propane, 2,2'-bis[p-(p'-aminophenoxy)biphenyl]propane, and 2,2'-bis[p-(m-aminophenoxy)phenyl]benzophenone.

An example of the cardo-type fluorenediamine derivatives is 9,9-bisanilinefluorene.

The number of carbon atoms of aliphatic diamine is, for example, about 2 or more and 15 or less. Specific examples of aliphatic diamine include pentamethylenediamine, hexamethylenediamine, and heptamethylenediamine.

Note here that hydrogen atoms of these diamines may be a compound having at least one substituent selected from the group consisting of halogen atoms and methyl, methoxy, cyano, and phenyl groups.

There is no particular limitation to means for producing the polyamide acid, and, for example, well-known technique such as a method for reacting an acid and a diamine component in a solvent can be used.

The reaction of a tetracarboxylic dianhydride and a diamine is usually performed in a solvent. The solvent to be used for the reaction of a tetracarboxylic dianhydride and a diamine is not particularly limited and may be any solvents that can dissolve the tetracarboxylic dianhydride and the diamine without reacting with the tetracarboxylic dianhydride and the diamine. One type of solvent may be used alone or in combination of two or more types thereof.

Examples of the solvent to be used for the reaction of a tetracarboxylic dianhydride and a diamine include nitrogen-containing polar solvents, such as N-methyl-2-pyrrolidone, N,N-dimethyl acetamide, N,N-diethylacetamide, N,N-dimethylformamide, N,N-diethylformamide, N-methylcaprolactam, and N,N,N',N'-tetramethylurea; lactone polar solvents, such as β-propiolactone, γ-butyrolactone, γ-valeroiactone, δ-valerolactone, γ-caprolactone, and ε-caprolactone; dimethyl sulfoxide; acetonitrile; fatty acid esters, such as ethyl lactate and butyl lactate; ethers, such as diethylene glycol dimethyl ether, diethylene glycol diethyl ether, dioxane, tetrahydrofuran, methyl cellosolve acetate, and ethyl cellosolve acetate; and phenol solvents, such as cresols and xylene-based solvent. One type of these solvents may be used alone or in combination of two or more types thereof. The amount of the solvent to be used is not particularly limited but is desirably such that the content of the resulting polyamide acid is 5% or more and 50% by mass or less.

Among these solvents, from the viewpoint of the solubility of the resulting polyamide acid, preferred are nitrogen-containing polar solvents, such as N-methyl-2-pyrrolidone, N,N-dimethyl acetamide, N,N-diethylacetamide, N,N-dimethylformamide, N,N-diethylfcrmamide, N-methylcaprolactam, and N,N,N',N'-tetramethylurea.

The polymerization temperature is usually −10° C. or more and 120° C, or less and preferably 5° C. or more and 30° C. or less. The polymerization time varies depending on the raw material composition to be used, and is usually 3 hours or more and 24 hours or less. One type of the polyamide acid may be used alone or in combination of two or more types thereof.

Polyimide

The polyimide can be any known polyimide, and used without any limitation to its structure and molecular weight. The side chain of the polyimide may have a condensable functional group, such as a carboxy group, or a functional group enhancing the cross-linking reaction, etc. during burning. Furthermore, when the composition for producing a porous film contains a solvent, polyimide that can be solved in a solvent used is preferable.

In order to make the polyimide soluble in a solvent, it is effective to use a monomer for introducing a flexible bend structure into the main chain, for example, to use an aliphatic diamine, such as ethylenediamine, hexamethylenediamine, 1,4-diaminocyclohexane, 1,3-diaminocyclohexane, or 4,4'-diaminodicyclohexylmethane; an aromatic diamine, such as 2-methyl-1,4-phenylenediamine, o-tolidine, m-tolidine, 3,3'-dimethoxybenzidine, or 4,4'-diaminobenzanilide; a polyoxyalkylenediamine, such as polyoxyethylenediamine, polyoxypropylenediamine, or polyoxybutyrenediamine; a polysiloxanediamine; 2,3,3',4'-oxydiphthalic anhydride, 3,4,3',4'-oxydiphthalic anhydride, or 2,2-bis(4-hydroxyphenyl)propanedibenzoate-3,3',4,4'-tetracarboxylic dianhydride. It is also effective to use a monomer containing a functional group for improving the solubility in a solvent, for example, to use a fluorinated diamine, such as 2,2'-bis(trifluoromethyl)-4,4'-diaminobiphenyl or 2-trifluoromethyl-1,4-phenylenediamine. Furthermore, in addition to the monomer for improving the solubility of the polyimide, a monomer that is mentioned in the paragraph describing the polyamide acid may be used within a range that does not inhibit the solubility. Each of polyimide and the monomer thereof may be used alone or may be used in combination of two or more types thereof.

There is no limitation to means for producing polyimide. Polyimide may be produced by any well-known techniques, for example, chemically imidizing or thermally imidizing polyamide acid. Examples of such polyimides include aliphatic polyimide (full-aliphatic polyimides) and aromatic polyimides, and aromatic polyimides are preferable. The aromatic polyimide may be one prepared by a thermal or chemical ring-closing reaction of a polyamide acid having repeating units represented by Formula (1) or a polyimide having repeating units represented by Formula (2). In the formulae, Ar represents an aryl group. When the composition for producing a porous film contains a solvent, these polyimides may be then solved in a solvent to be used.

[Chem. 1]

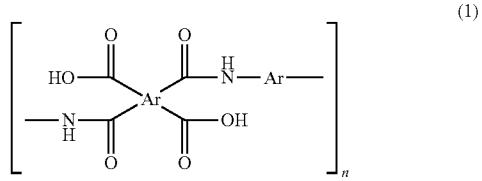

(1)

[Chem. 2]

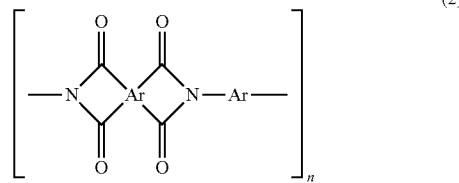

(2)

Polyamide-imide and Polyamide-imide Precursor

Any well-known polyamide-imides can be used without limitation to the structure or molecular weight. The side chain of the polyamide-imide may have a condensable functional group, such as a carboxy group, or a functional group enhancing the cross-linking reaction, etc. during burning. Furthermore, when the composition for producing a porous film contains a solvent, a soluble polyamide-imide that can be solved in a solvent to be used is preferable.

As the polyamide-imide, (i) a resin obtained by reacting an acid having a carboxyl group and an acid anhydride group with diisocyanate in one molecule of trimellitic anhydride and the like, (ii) a resin obtained by imidization of a precursor polymer obtained by reacting a reactive derivative of the acid such as trimellitic anhydride chloride and diamine (a polyamide-imide precursor) can be usually used without particular limitation.

Examples of the above-mentioned acids or the reactive derivatives include trimellitic anhydride, trimellitic anhydride halides such as trimellitic anhydride chloride, trimellitic anhydride esters, and the like.

Examples of the above-mentioned optional diamine include diamines described as an example in the description of the above-mentioned polyamide acid. A diaminopyridine compound can also be used.

The above mentioned any diisocyanate is not particularly limited, and includes, for example, a diisocyanate compound corresponding to the above-mentioned optional diamine can be used. Specific examples thereof include meta-phenylene diisocyanate, p-phenylene diisocyanate, o-tolidine diisocyanate, p-phenylene diisocyanate, m-phenylene diisocyanate, 4,4'-oxybis (phenyl isocyanate), 4,4'-diphenylmethane diisocyanate, bis[4-(4-isocyanate phenoxy) phenyl] sulfone, 2,2'-bis[4-(4-isocyanate phenoxy) phenyl] propane, 2,4-tolylene diisocyanate, 2,6-tolylene diisocyanate, 4,4'-diphenylmethane diisocyanate, 3,3'-dimethyldiphenyl-4,4'-diisocyanate, 3,3'-diethyldiphenyl-4,4'-diisocyanate, isophorone diisocyanate, hexamethylene diisocyanate, 4,4'-dicyclohexyl methane diisocyanate, m-xylene diisocyanate, p-xylene diisocyanate, naphtalen diisocyanate, and the like, can be exemplified.

As a raw material monomer of polyamide-imide, in addition to the above, it is possible to use compounds described as general formulae in Japanese Unexamined Patent Application, Publication No. S63-283705 and Japanese Unexamined Patent Application, Publication No. H2-198619. Furthermore, the imidization in the method described in the above (ii) may be any one of thermal imidization and chemical imidization. As the chemical imidization, a method of immersing an unburned composite film formed by using a composition for producing a porous film such as a polyamide-imide precursor in a mixed solvent including acetic anhydride, or acetic anhydride and isoquinoline, and the like can be used. Note here that the polyamide-imide precursor can be referred to as a polyimide precursor from the viewpoint that it is a precursor before imidization.

The polyamide-imide to be contained in a varnish may be the above-mentioned (1) a polymer obtained by reacting an acid such as trimellitic anhydride and diisocyanate with each other, (2) a polymer obtained by imidization of a precursor polymer obtained by reacting a reactive derivative of the above-mentioned acid such as trimellitic anhydride and diamine with each other, or the like. The term "polyamide-imide precursor" in this specification and claims means a polymer before imidization (a precursor polymer". Each of polyamide-imide and polyamide-imide precursor may be used alone or in combination of two or more types thereof. Furthermore, as the polyamide-imide, each of the above-mentioned polymer, raw material monomer, and oligomer may be used alone or in combination of two or more types thereof.

Polyethersulfone

Polyethersulfone to be contained in a varnish can be appropriately selected depending on the use of porous film produced and it may be hydrophilic or hydrophobic. Furthermore, it may be aliphatic polyethersulfone or aromatic polyethersulfone. The mass average molecular weight is, for example, 5000 or more and 1,000,000 or less, and preferably 10,000 or more and 300,000 or less.

Fine Particles

The material of the fine particles is not particularly limited and may adopt any known material as long as the material is insoluble in the solvent contained in the varnish and can be removed later from resin-fine particle composite film. Examples of the inorganic material include metal oxides, such as silica (silicon dioxide), titanium oxide, and alumina ($Al_2O_3$). Examples of the organic materials include high-molecular-weight olefins (such as polypropylene and polyethylene) and organic polymer fine particles, such as polystyrenes, epoxy resins, celluloses, polyvinyl alcohols, polyvinyl butyrals, polyesters, and polyethers. The fine particles may be used alone or used in combination of two or more types thereof. As the fine particles, from the viewpoint that undesired deformation and the like do not easily occur in the dispersion step, inorganic fine particles including the above-mentioned inorganic materials are preferable.

Specific examples of the fine particles include colloidal silica. In particular, it is preferable to select monodisperse spherical silica particles because uniform pores can be formed.

Solvent

As the solvent, those described as an example of the solvents used for reaction between tetracarboxylic dianhydride and diamine can be used without limitation as long as the solvents can solve the resin component contained in a varnish and does not solve the fine particles. Furthermore, examples of the solvent used for allowing a varnish to contain polyethersulfone inclxide nitrogen-containing polar solvents such as N-methyl-2-pyrrolidone, N,N-dimethyl acetamide, N,N-diethylacetamide, N,N-dimethylformamide, N,N-diethylformamide, N-methylcaprolactam, and N,N,N',N'-tetramethylurea; polar solvents such as diphenylsulfone, dimethylsulfone, dimethylsulfoxide, benzophenone, tetrahydrothiophene-1,1-dioxide, and 1,3-dimethyl-2-imidazolidinone. The solvent may be used alone or in combination of two or more types thereof.

Dispersant

A dispersant may be added in addition to the fine particles, in order to uniformly disperse the fine particles in the varnish. The addition of the dispersant allows further uniform mixing of the resin component with the fine particles, and, in addition, allows uniform dispersion of the fine particles in the molded or formed film. As a result, dense apertures are provided on the surface of the finally formed a porous film, and the front and rear surfaces can be efficiently communicated with each other so as to improve the air permeability of the porous film. Furthermore, addition of the dispersant easily improves drying of the varnish, and easily improves peelability of the formed unburned composite film from a substrate and the like.

The dispersant is not particularly limited and any known dispersant may be used. Examples of the dispersant include, but not limited to, anionic surfactants, such as salts of coconut fatty acid, salts of sulfonated castor oil, lauryl sulfate, polyoxyalkylene allyphenyl ether sulfate, alkylbenzenesulfonic acid, alkylbenzene sulfonate, alkyldiphenyl ether disulfonate, alkyinaphthalene sulfonate, dialkyl sulfosuccinate, isopropyl phosphate, polyoxyethylene alkyl ether phosphate, and polyoxyethylene allylphenyl ether phosphate; cationic surfactants, such as oleylamine acetate, lauryl pyridinium chloride, cetyl pyridinium chloride, lauryl trimethylammonium chloride, stearyl trimethylammonium chloride, behenyl trimethylammonium chloride, and didecyl dimethylammonium chloride; amphoteric surfactants, such as coconut alkyl dimethylamine oxide, fatty acid amide propyl dimethyl amine oxide, alkyl polyaminoethyl glycine hydrochloride, amide betaine surfactant, alanine surfactant, and lauryl iminodipropionic acid; polyoxyalkylene primary alkyl ether or polyoxyalkylene secondary alkyl ether nonionic surfactants, such as polyoxyethylene octyl ether, polyoxyethylene decyl ether, polyoxyethylene lauryl ether, polyoxyethylene laurylamine, polyoxyethylene oleylamine, polyoxyethylene polystyryl phenyl ether, and polyoxyalkylene polystyryl phenyl ether; other polyoxyalkylene nonionic surfactants, such as polyoxyethylene dilaurate, polyoxyethylene laurate, polyoxyethylenated castor oil, polyoxyethylenated hydrogenated castor oil, sorbitan laurate, polyoxyethylene sorbitan laurate, and fatty acid diethanolamide; fatty acid alkyl esters, such as octyl stearate and trimethylolpropane tridecanoate; and polyether polyols, such as polyoxyalkyiene butyl ether, polyoxyalkylene oleyl ether, and trimethylol propane tris(polyoxyalkylene) ether. These dispersants may be used as a mixture of two or more thereof.

From the view point of, for example, the film formability, the content of the dispersant in the varnish is preferably 0.01% by mass or more and 5% by mass or less, more preferably 0.05% by mass or more and 1% by mass or less, and further more preferably 0.1% by mass or more and 0.5% by mass or less, with respect to the fine particles.

Method for Producing Porous Film

A method for producing a porous film includes an unburned composite film forming step of forming an unburned composite film using the above-mentioned varnish; a burning step of burning the unburned composite film to obtain a resin-fine particle composite film; and a fine particle-removing step of removing the fine particles from the resin-fine particle composite film.

Method for Producing Unburned Composite Film
(Unburned Composite Film Forming Step)

Hereinafter, a method for forming an unburned composite film will be described. In an unburned composite film forming step, an unburned composite film is formed using the varnish mentioned above. At this time, the unburned composite film may be formed directly on a substrate or on a lower layer film that is different from the unburned composite film. Furthermore, after the unburned composite film is formed using the above-mentioned varnish (composition for producing a porous film), an upper layer film that is different from the above-mentioned unburned composite film may be further formed in the upper layer. Note here that in this application, both the method for providing a lower layer film on the substrate, and the method for further forming an upper layer film that is different from the above-mentioned unburned composite film by using the above-mentioned varnish after the unburned composite film is formed, are included in the method for forming an unburned composite film on the substrate. However, when the resin component contained in the above-mentioned varnish is a polyamide acid or a polyamide-imide precursor, and when a material that does not need a burning step is used for the upper layer film, an upper layer film may be formed on the resin-fine particle composite film after burning may be formed. The unburned composite film can be formed by, for example, applying the above-mentioned varnish onto the substrate or the lower layer film, and drying thereof at normal pressure or under vacuum at 0° C. or more and 100° C. or less, and preferably at normal pressure at 10° C. or more and 100° C. or less. Examples of the substrate include a PET film, a SUS substrate, a glass substrate, and the like.

Examples of the lower layer film (or upper layer film) include a lower (or upper) layer unburned composite film formed using a varnish for forming a lower layer film (or upper layer film) containing a resin including polyamide acid, polyimide, a polyamide-imide precursor, polyamide-imide and polyethersulfone, fine particles, and a solvent, wherein the content, of the fine particles is 40% by volume or more and 81% by volume or less with respect to the total of the resin and the fine particles. The lower layer unburned composite film may be formed on the substrate. When the content of the fine particles is more than 40% by volume, the particles are uniformly dispersed; and when the content of the fine particles is 81% by volume or less, the particles are dispersed without causing aggregation of particles. Consequently, pores can be formed uniformly in the porous film. Furthermore, when the content of the fine particles is within the above-mentioned range, when the lower layer unburned composite film is formed on the substrate, even when the substrate is not provided with a mold release layer in advance, mold releasability after film formation can be easily secured.

Note here that the fine particles to be used for the varnish for forming a lower (or upper) layer film and the fine particles to be used for the above-mentioned varnish may be the same as or different from each other. In order to increase the density of pores in the lower (or upper) layer unburned composite film, it is preferable that the fine particles to be used for the varnish for forming a lower (or upper) layer film has a particle diameter distribution index that is equal to or smaller than that of the fine particles to be used for the above-mentioned varnish. Alternatively, it is preferable that the fine particles to be used for the varnish for a lower (or upper) layer film have a sphericity that, is equal to or smaller than that of the fine particles to be used for the above-mentioned varnish.

Furthermore, the average particle diameter of the fine particles to be used for the varnish for forming a lower (or upper) layer film is preferably 5 nm or more and 1000 nm or less, and more preferably 10 nm or more and 600 nm or less.

Furthermore, the content of the fine particles to be used for the varnish for forming a lower (or upper) layer film may be larger or smaller than that of the above-mentioned varnish. Suitable examples of the components such as a resin component, fine particles, and a solvent included in the varnish for forming a lower (or upper) layer film are the same as those in the above-mentioned varnish. The varnish for forming a lower (or upper) layer film can be prepared by the same method as that of the above-mentioned varnish. The lower layer unburned composite film can be formed by, for example, applying the varnish for a lower layer film onto the substrate, followed by drying at normal pressure or under vacuum at 0° C. or more and 100° C. or less, and preferably at normal pressure at 10° C. or more and 100° C. or less. The same is true to the film formation conditions of the upper layer unburned composite film.

Furthermore, examples of the lower (or upper) layer film include films made of fiber materials such as cellulose resin, non-woven fabric (for example, polyimide non-woven fabric or the like (a fiber diameter is, for example, about 50 nm or more and about 3000 nm or less)), a polyimide film, and the like.

Furthermore, a burning step of burning the unburned composite film or a laminated film of the unburned composite film and the lower (or upper) layer film so as to obtain a resin-fine particle composite film is carried out. When the unburned composite film or the lower layer unburned composite film is formed on the substrate, burning may be carried out as it is, or the unburned composite film or the laminated film of the unburned composite film and the lower layer unburned composite film may be peeled off from the substrate before carrying out the burning step.

Note here that when the above-mentioned lower (or upper) layer film is a lower (or upper) layer unburned composite film formed using a varnish for forming a lower (or upper) layer film, and the composition of the varnish for forming a lower (or upper) layer film is the same as the composition of the varnish to be used for formation of the above-mentioned unburned composite film, the laminated film of the above-mentioned unburned composite film and the above-mentioned lower (or upper) layer film are substantially one layer (single layer).

When the unburned composite film or the laminated film of the unburned composite film and the lower (or upper) layer unburned composite film is peeled from the substrate, the substrate provided with a mold release layer in advance can also be used in order to further enhance the releasability of the film. In a case of providing a mold release layer in the substrate in advance, the mold release agent is applied onto the substrate and is dried or baked before the application of the composition for producing a porous film. The mold release agent used here may be a known mold release agent, such as an alkylphosphate ammonium salt-based or fluorine-based agent or silicon, without particular restrictions. When the dried unburned composite film is peeled from the substrate, a slight amount of the mold release agent remains on the surface of the peeled unburned composite film and may lead to discoloration during burning and adverse effects on the electrical characteristics, and the mold release agent should therefore be removed as much as possible. In order to remove the mold release agent, a washing step of washing the unburned composite film or the laminated film of the unburned composite film and the lower layer unburned composite film peeled from the substrate with an organic solvent may be introduced.

Alternatively, when the substrate is directly used, as it is, without providing a mold release layer in formation of the unburned composite film or the lower layer unburned composite film, the step of forming the mold release layer and the washing step can be omitted. Furthermore, in the method for producing an unburned composite film, before the below-mentioned burning step, an immersion step into a water-containing solvent, a pressing step, and a drying step after the immersion step may be optionally provided.

Production of Resin-fine Particle Composite Film (Burning Step)

When a resin component contained in a varnish is polyamide acid or a polyamide-imide precursor, the unburned composite film is subjected to heat treatment as post-treatment (burning) to be formed into a composite film (resin-fine particle composite film) composed of resin made of polyamide and/or polyamide-imide and fine particles. Note here that when the resin component contained in a varnish is polyimide, polyamide-imide or polyethersulfone, a burning step may not be carried out. In the unburned composite film forming step, when the unburned composite film is formed on a lower layer film that is different from the unburned composite film, the lower layer film together with the unburned composite film is burned in the burning step. The burning temperature in the burning step varies depending on the structures of the unburned composite film and the lower layer film and the presence or absence of a condensing agent, but the temperature is preferably 120° C. or more and 450° C. or less, and more preferably 150° C. or more and 400° C. or less. In a case of using an organic material for the fine particles, the burning temperature need to be set to a temperature lower than the thermal decomposition temperature of the organic material. When the resin component contained in the varnish is polyamide acid, in the burning step, imidization is preferably completed.

The burning can be performed by, for example, a method of increasing the temperature from room temperature to 400° C. over three hours and then holding 400° C. for 20 minutes or a method of stepwise drying-thermal imidization by stepwise increasing the temperature by 50° C. from room temperature to 400° C. (holding the temperature of each step for 20 minutes) and finally holding 400° C. for 20 minutes. When the unburned composite film is formed on the substrate and the unburned composite film is peeled from the substrate once, an end of the unburned composite film may be fixed to, for example, a frame made of SUS stainless steel to prevent deformation.

The thickness of the resulting resin-fine particle composite film can be determined by, for example, measuring the thicknesses of a plurality of positions with a micrometer or the like and averaging the thicknesses. Preferred average thickness varies depending on the application of use of porous film, however, is preferably 5 µm or more and 500 µm or less, more preferably 10 µm or more and 100 µm or less, and further preferably 15 µm or more and 30 µm or less, for example, in the use as a separator or the like. The average thickness is preferably 5 µm or more and 500 µm or less, and more preferably 10 µm or more and 300 µm or less, and further preferably 20 µm or more and 150 µm or less in the use as a filter or the like.

Porosification of Resin-fine Particle Composite Film (Fine Particle-removing Step)

The porous film can be produced with high reproducibility by selecting an appropriate method for removing the fine particles from the resin-fine particle composite film.

For example, when silica is employed as the material of the fine particles, the silica can be removed by treating the resin-fine particle composite film with, for example, a low-concentration hydrogen fluoride solution to dissolve the silica.

Alternatively, an organic material can also be selected as the material of the fine particles. Any organic material, which is decomposed at a temperature lower than resin contained in the resin-fine particle composite film, may be used without particular limitation. Examples of the fine particles include resin fine particulates composed of linear polymers and known depolymerizable polymers. The linear polymer usually has a molecular chain that is randomly cleaved during thermal decomposition; and the depolymerizable polymer is decomposed into a monomer during thermal decomposition. Both of them are decomposed into a low molecular weight substance or to $CO_2$ and disappear from the resin-fine particle composite film. A decomposition temperature of the resin fine particles to be used is preferably 200° C. or more and 320° C. or less, and more preferably 230° C. or more and 260° C. or less. A decomposition temperature of 200° C. or more allows formation of a film even if the composition for producing a porous film contains a high boiling point solvent and broadens the selection of burning conditions of the polyimide. Furthermore, a decomposition temperature of less than 320° C. allows the resin fine particles alone to disappear without thermally damaging the polyimide.

The total thickness of the porous film is not particularly limited, and is preferably 5 µm or more and 500 µm or less, more preferably 10 µm or more and 100 µm or less, and further preferably 15 µm or more and 30 µm or less, when, for example, the porous film is used for a separator or the like. The thickness is preferably 5 µm or more and 500 µm or less, more preferably 10 µm or more and 300 µm or less, and further preferably 20 µm or more and 150 µm or less, when, for example, the porous film is used for a filter or the like. Similar to the measurement of the resin-fine particle composite film, the above-mentioned thickness can be determined by, for example, measuring thicknesses of a plurality of positions with a micrometer or the like and averaging the thicknesses.

When the porous film is formed of two or more types of compositions for producing a porous film, in cases such as when it is produced by combination with a layer by the other composition for producing a porous film by a preparation method that is different from the producing method of the present invention, the ratio in the thickness direction of the region formed by each composition for producing a porous film may be appropriately determined depending on the application of use of the porous film. When a porous film has two regions, that is, a layer (I) by composition for producing a porous film according to the present invention and a layer (II) by the other composition for producing a porous film that is different from the producing method according to the present invention, the ratio ((I):(II)) of each region in the thickness direction may be adjusted to, for example, 1:99 to 99:1, preferably 5:95 to 95:5. The thickness of each layer can be calculated by averaging thicknesses at a plurality of positions in a cross section of the porous polyimide film by observing under, for example, a scanning electron microscope (SEM).

Resin-removing Step

A method for producing a porous film may include a resin-removing step of removing at least a part of a resin portion of a resin-fine particle composite film before the fine particle-removing step, or removing at least a part of the porous film after the fine particle-removing step. When at least a part of the resin-fine particle composite film is removed before the fine particle-removing step and when the fine particles are removed and pores are formed in the subsequent fine particle-removing step, the aperture rate of the porous film of the final product can be improved as compared with the case where at least a part, of the resin portion is not removed. Furthermore, when at least a part of the porous film is removed after the fine particle-removing step, the aperture rate of the porous film of the final product can be improved as compared with the case where at least a part of the porous film is not removed.

The step of removing at least a part of the resin portion or the step of removing at least a part of the porous film can be carried out by a usual chemical etching or physical removing method, or a method combining these methods.

The chemical etching method includes treatment using a chemical etchant such as an inorganic alkaline solution or an organic alkaline solution. An inorganic alkaline solution is preferable. Examples of the inorganic alkaline solution include a hydrazine solution including hydrazine hydrate and ethylenadiamine; a solution of alkaline metal hydroxide such as potassium hydroxide, sodium hydroxide, sodium carbonate, sodium silicate, and sodium metasilicate; an ammonium solution; an etchant including alkali hydroxide, hydrazine, and 1,3-diroethyl-2-imidazolidinone as a main component, or the like. Examples of the organic alkaline solution include an alkaline solution of primary amines such as ethyl amine and n-propyl amine; secondary amines such as diethyl amine and di-n-butylamine; tertiary amines such as triethylamine and methyl diethyl amine; alcohol amines such as dimethyl ethanol amine and triethanolamine; quaternary ammonium salts such as tetramethylammonium hydroxide and tetraethylammonium hydroxide; cyclic amines such as pyrrole and piperidine, or the like.

As a solvent for each solution, pure water and alcohols can be appropriately selected. Furthermore, solvents in which an appropriate amount of surfactant is added can be used. An alkali concentration is, for example, 0.01% by mass or more and 20% by mass or less.

Furthermore, examples of the physical method include dry etching by plasma (oxygen, argon, etc.), corona discharge, or the like, a method for treating a surface of a film by dispersing abrasives (for example, alumina (rigidity 9), or the like) in a liquid and irradiating the surface of a film with the liquid at the irradiation rate of 30 m/s or more and 100 m/s or less, and the like.

The above-mentioned methods are preferable because they are applicable in the resin-removing step both before and after the fine particle-removing step.

On the other hand, as the physical method that can be applied only to the resin-removing step carried out after the fine particle-removing step, a method of compression bonding a mount film (for example, a polyester film such as a PET film) whose subject surface is wetted with liquid and then peeling a porous film from the mount film after drying or without drying can be employed. Due to the surface tension of the liquid or electrostatic adhesion, the porous film is peeled from the mount film with only the surface layer of the porous film left on the mount film.

According to the method described above, a porous film including at least one resin component selected from the group consisting of polyimide, polyamide-imide, and polyethersulfone can be produced while fine particles having a small particle diameter are satisfactorily dispersed. With the specific dispersion conditions according to the first or second embodiment, since fine particles having a small particle diameter do not easily aggregate and the particle diameter is kept constant in the composition for producing a porous film including the resin component, even in the above-described unburned composite film forming step and resin-fine particle composite film forming step, a composite film in which particles whose particle diameter is kept constant are uniformly distributed can be obtained. A contact portion with the fine particles in the composite film is a pore diameter in a porous film obtained after the fine particle-removing step. Therefore, according to the method described above, a porous film in which almost all pores are distributed in a region at the smallest-diameter side in the pore diameter distribution, and which has micropores with less dispersion of the pore diameter (furthermore, a porous film having spherical pores in a case where fine particles used are spherical) can be produced.

Specifically, a porous film can be produced in which in a pore diameter distribution of the porous film as distribution of every 1 nm section, obtained by measurement by a bubble point method under conditions in which a measured pressure range is 0 or more and 400 psi or less, using perfluoropolyester having an interfacial tension value of 15.9 dyne/cm, a sum of pore distribution (%) in a first section having the smallest pore diameter and pore distribution (%) in a second section having the second smallest pore diameter is 70% or more, and no section other than the first section and the second section has pore distribution of 7% or more.

EXAMPLES

The present invention will now be more specifically described with reference to Examples, but the scope of the present invention is not limited to these Examples.

Example 1

Slurry A including 70 parts by mass of silica, 0.35 parts by mass of dispersant, and a solvent was stirred at 4000 rpm for one hour with an impeller in a 1000-mL vessel. Then, the stirred slurry A was subjected to dispersion treatment ten times using a dispersing device, manufactured by YOSHIDA KIKAI CO., LTD, provided with a flow path having a diameter of 60 µm (cross-sectional area: 2826 µm$^2$). In the dispersion treatment, the slurry A was allowed to pass through a flow path at 200 MPa. Note here that the flow path of the dispersing device is configured such that two flow paths are joined to cause collision of the slurry A. As the silica, silica having an average particle diameter of 100 nm was used. The slurry A which had undergone the dispersion treatment and 30 parts by mass (solid content of polyamide acid) of polyamide acid (20% by mass dimethylacetamide solution) were mixed with each other to obtain slurry B. The slurry B includes dimethylacetamide and gamma-butyrolactone such that a solid content concentration thereof was 27% by mass (mass ratio of the final solvent composition of dimethylacetamide:gamma-butyrolactone was 90:10). The obtained slurry B was stirred at 4000 rpm for 30 minutes with an impeller in a 1000-mL vessel. Then, the slurry B was subjected to dispersion treatment ten times using a dispersing device, manufactured by YOSHIDA KIKAI CO., LTD, provided with a flow path having a diameter of 60 µm (cross-sectional area: 2826 µm$^2$) to prepare a composition for producing a porous film. In the dispersion treatment, the slurry B was allowed to pass through a flow path at 200 MPa. The composition for producing a porous film was applied onto the substrate, followed by heating at 90° C. for 300 seconds to remove a solvent to form a coating film having a film thickness of about 40 µm.

Burning Step

The formed coating film was subjected to heat treatment (burning) at 380° C. for 15 minutes for imidization so as to obtain a resin-fine particle composite film.

Fine Particle Removing Step

The obtained resin-fine particle composite films were immersed in 10% HF solution for 10 minutes to remove fine particles included in the film. After removal of fine particles, washing with water and drying were carried out, a porous film was obtained.

Pore diameter distribution measurement of the obtained porous film was measured by the bubble point method. The pore diameter distribution measurement was carried out using a palm porometer porous material automatic pore diameter distribution system (manufactured by PMI) according to a half-dry method (ASTM E 1294-89) using a perfluoropolyester (product name: Galwick, Surface tension value: 15.9 dyne/cm) at a measuring temperature of 25° C. and a measuring pressure range of 0 to 400 psi.

The pore diameter range and pore diameter distribution (%) of the first section in which the pore diameter is the smallest, the pore diameter range and pore diameter distribution (%) of the second section in which the pore diameter is the second smallest, the sum of the pore diameter distribution of the first section and the pore diameter distribution of the second section, and the maximum value in the pore diameter distribution of sections other than the first section and the second section (third section and subsequent sections), which were obtained in the pore diameter distribution measurement, are shown in Table 1.

Comparative Example 1

A composition for producing a porous film was prepared and a porous film was produced by the same method as in Example 1 except that the treatment using the dispersing device manufactured by YOSHIDA KIKAI CO., LTD is changed to treatment using a rotation and revolution centrifugal vacuum mixer (High Rotor manufactured by Mitsuboshi Kogyo Co., Ltd.). Similar to Example 1, the obtained porous film was subjected to pore diameter distribution method. Measurement results of the pore diameter distribution are shown in Table 1.

TABLE 1

|  | First section | | Second section | | Pore diameter distribution A + | Maximum value in pore diameter distribution |
| --- | --- | --- | --- | --- | --- | --- |
|  | pore diameter range | pore diameter distribution A | pore diameter range | pore diameter distribution B | Pore diameter distribution B | of third section and subsequent sections |
| Example 1 | 20.5 nm or more less than 21.5 nm | 38.1% | 21.5 nm or more less than 22.5 nm | 36.3% | 74.4% | 6.4% |
| comparative example 1 | 24.5 nm or more less than 25.5 nm | 34.7% | 25.5 nm or more less than 26.5 nm | 29.1% | 63.8% | 9.7% |

According to Example 1, whan dispersion treatment is carried out using a dispersing device provided with a flow path having a cross-sectional area of 1960 µm² or more and 785000 µm² or less, in which slurry pressurized to 50 MPa or more is allowed to pass through the flow path, silica having an average particle diameter of 100 nm can be satisfactorily dispersed. As a result, it is shown that a porous film including many micropores in the first section and the second section, and having a small number of bulky pores can be produced. On the other hand, according to Comparative Example 1, when dispersion treatment is carried out using a rotation and revolution centrifugal vacuum mixer instead of dispersion treatment in which slurry is allowed to pass through a very thin flow path as in Example 1, a porous film whose the smallest pore diameter is larger than that of the porous film obtained in Example 1, and having a small number of micropores in the first section and the second section, and a large number of bulky pores is formed.

What is claimed is:

1. A method for producing a porous film, comprising:
    preparing a composition for producing a porous film comprising at least one resin component selected from the group consisting of polyamide acid, polyimide, a polyamide-imide precursor, polyamide-imide and polyethersulfone, and fine particles,
    wherein the preparing comprises: dispersing the fine particles in a slurry using a dispersing device provided with a pressure device that pressurizes the slurry comprising the fine particles, the dispersing device having a flow path whose cross-sectional area is 1960 µm² or more and 785000 µm² or less, wherein the slurry is pressurized to 50 MPa or more, forming a pressurized slurry, and the pressurized slurry passes through the flow path;
    forming a film from the pressurized slurry; and
    removing the fine particles from the film to form the porous film,
    wherein in a pore diameter distribution of the porous film as a distribution of every 1 nm section, obtained by measurement by a bubble point method under conditions in which a measured pressure range is 0 psi or more and 400 psi or less, using perfluoropolyester having an interfacial tension value of 15.9 dyne/cm, a sum of pore distribution (%) in a first section having the smallest pore diameter and pore distribution (%) in a second section having the second smallest pore diameter is 70% or more, and no section other than the first section and the second section has pore distribution of 7% or more.

2. The method according to claim 1, comprising: allowing the pressurized slurry to collide against one another or to collide against a collision part provided on the flow path.

3. The method according to claim 1, wherein a content of the fine particles in the slurry is 20% by mass or more and 90% by mass or less with respect to a mass of the slurry.

4. The method according to claim 1, wherein the fine particles are inorganic fine particles.

5. The method according to claim 1, further comprising:
    forming an unburned composite film using the composition for producing a porous film;
    burning the unburned composite film to obtain a resin-fine particle composite film; and
    removing fine particles from the resin-fine particle composite film.

6. The method according to claim 1, wherein the slurry is pressurized to 130 MPa or more.

7. A method for producing a composition for producing a porous film, comprising:
    preparing slurry (1) comprising fine particles and a solvent;
    preparing a resin liquid (1) comprising at least one resin component selected from the group consisting of polyamide acid, polyimide, a polyamide-imide precursor, polyamide-imide and polyethersulfone, and a solvent;
    preparing slurry (2) by kneading the slurry (1) and the resin liquid (1); and
    dispersing the fine particles in the slurry (2) using a dispersing device provided with a pressure device that pressurizes the slurry (2), the dispersing device having a flow path having a cross-sectional area of 1960 µm² or more and 785000 µm² or less,
    wherein the slurry (2) is pressurized to 50 MPa or more, forming a pressurized slurry, and the pressurized slurry passes through the flow path;

forming a film from the pressurized slurry; and
removing the fine particles from the film to form a porous film,
wherein in a pore diameter distribution of the porous film produced with the composition as a distribution of every 1 nm section, obtained by measurement by a bubble point method under conditions in which a measured pressure range is 0 psi or more and 400 psi or less, using perfluoropolyester having an interfacial tension value of 15.9 dyne/cm, a sum of pore distribution (%) in a first section having the smallest pore diameter and pore distribution (%) in a second section having the second smallest pore diameter is 70% or more, and no section other than the first section and the second section has pore distribution of 7% or more.

8. The method according to claim 7, comprising allowing the pressurized slurry to collide against one another or to collide against a collision part provided on the flow path.

9. The method according to claim 7, wherein the slurry (2) is pressurized to 130 MPa or more.

* * * * *